United States Patent Office 3,646,184
Patented Feb. 29, 1972

3,646,184
METHOD FOR PRODUCING LESS-STICKY PELLETS OF AMORPHOUS POLYPROPYLENE
Nobuo Nagao, Yokohamashi, and Toshio Okuda, Ichiharashi, Japan, assignors to Chisso Corporation, Osaka, Japan
Filed Nov. 10, 1969, Ser. No. 875,166
Int. Cl. B02c 18/00
U.S. Cl. 264—144                    1 Claim

ABSTRACT OF THE DISCLOSURE

This invention involves forming a reservoir of melted sticky atactic polypropylene having a molecular weight of 10,000 and 100,000, a viscosity of 10 to 1,000 centipoises at a temperature of 130° to 250° C., having a revolving drum dip between 1–50 mm. below the surface of reservoir while revolving it at a linear velocity of 0.005–0.5 m.p.s. so that a layer of polypropylene between 1 mm. and 3 mm. thick adheres to the surface of the drum, cooling the drum, peeling the solidified layer from the rotating drum as a thin sheet, cutting said sheet longitudinally and transversely, and recovering a plurality of pellets of atactic polypropylene that have no mutual stickiness.

DESCRIPTION

Figure 1:
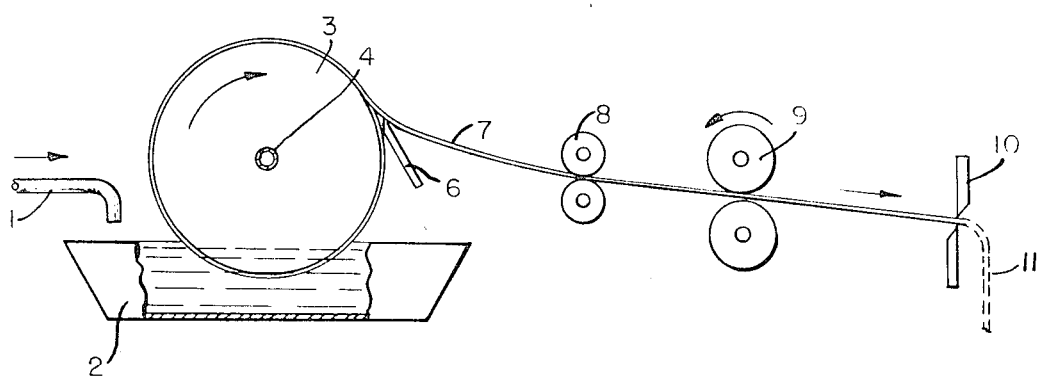

This invention relates to a method for treating amorphous polypropylene (hereinafter this will be referred to as atactic P.P.). More particularly this invention relates to a method for producing from atactic P.P., pellets having no mutual stickiness.

The atactic P.P. is produced as a by-product when crystalline polypropylene (hereinafter this will be referred to as isotactic P.P.) is produced from propylene by using a Ziegler-Natta type catalyst.

Since atactic P.P. thus produced as a by-product, is in the state dissolved in a solvent used in the polymerization of propylene, sticky cakes or particles mutually adhered to form a block as a whole, are obtained when the solvent is removed by distillation. These cake or block form atactic P.P. are not only materials difficult to divide into suitable size of crumb but also materials which stick to each other during storage even if they are once made into crumb form; hence handling thereafter is extremely inconvenient.

Accordingly, if pellets which do not adhere to each other or are difficult to adhere, are produced from such atactic P.P., the operation for blending atactic P.P. with polyolefines such as isotactic P.P., various synthetic resins; natural resins; rubber; asphalt; pitch; lubricant; steel milling oil and various kinds of mats, becomes easier and resultant blends can find their applications in large varieties of field such as shaped articles of plastics, foam, film, sheets, coating materials, rubber products, pavement materials, various formulated oily matters, emulsion and the like.

However, if conventionally known technique is employed, it is extremely difficult or next to impossible to prepare the pellets of atactic P.P. Namely the atactic P.P. processed in an extruder or a mixing roll increases its stickiness to a greater value than that before processed. This tendency is particularly notable in case of those having a mean molecular weight of 10,000 to 40,000. The pelletizing of such ones is practically impossible. The same thing can be said with regard to those having a molecular weight of 40,000 to 100,000 or of more than 100,000.

It is an object of the present invention to provide a method for producing pellets of atactic P.P. which do not adhere to each other.

The inventors of the present invention have found, after comprehensive studies on these difficult problems, that if atactic P.P. freed of remaining solvent or moisture by heating and melting, is quenched to be resolidified, the stickiness of surface is extremely reduced compared with that before melting. So if such resolidified materials can be obtained in the form of granule or pellet, the handling of atactic P.P. thereafter becomes very easy.

In order to make such quenching possible, it is necessary to make melted atactic P.P. into a thin layer and quench it immediately by contacting with a cooling surface. When atactic P.P. in hot state is extruded from an extruder or a mixing roll into semi-fluid filaments or sheets and cooled immediately thereafter by cooling water or a cooling surface, the reduction of stickiness cannot be attained, because the atactic P.P. shaped in a hot state and cooled by air to semi-fluid state does not lower its inherent stickiness, however fast it is cooled. Particularly in case of the atactic P.P. having a mean molecular weight of 10,000–40,000, even the extrusion in such semi-shaped state, is not easy because of its highly thixotropic property.

The inventors of the present invention have solved such a difficult problem by the method of the present invention which comprises heating and melting atactic P.P., solidifying the melt in a thin layer upon a cooling surface of revolving cooling drum, peeling the solidified thin layers continuously so as to give a thin sheet and shredding the sheet longitudinally and transversely to give non-sticky atactic P.P. pellet.

The inventors of the present invention employed an apparatus heerinafter described to carry out the above-mentioned method.

Figure 2:
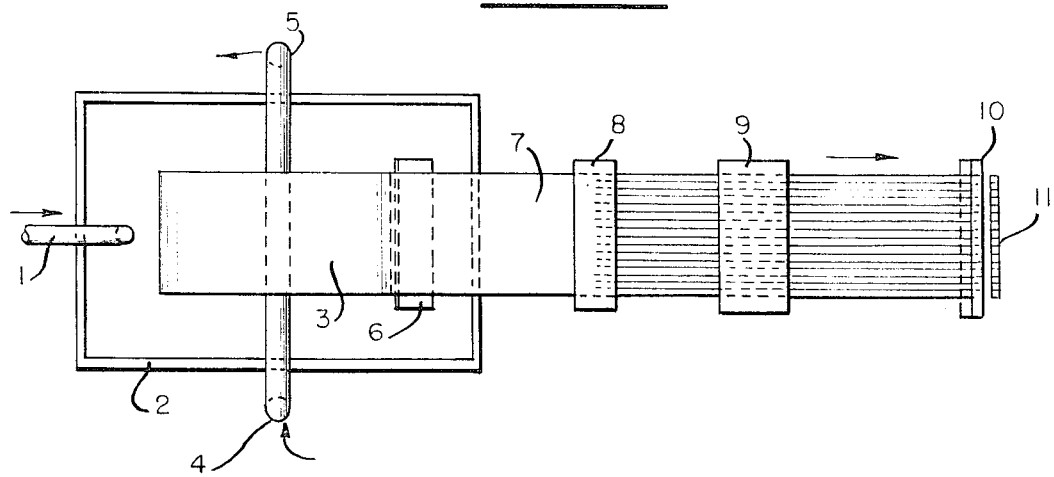

Referring to FIGS. 1 and 2 there are shown schematically a side elevational view and a plan view of the apparatus employed in the method of the present invention, respectively.

In the drawings, 1 is a feed pipe for flowing melted atactic P.P., 2 is a reservoir for the melt which always holds a fixed amount of melted atactic P.P. at a fixed temperature during the operation and 3 is a revolving drum having a cooling surface for quenching which is cooled by passing a cooling water from the inlet 4 of axial part through the inside and to the outlet 5 of axial part. The revolving drum 3 picks up a fixed amount of atactic P.P. from the reservoir 2 with a fixed rate. The amount and the thickness of atactic P.P. adhered to the revolving drum depend upon the width and depth of immersion of the drum, the linear velocity of the cooling surface, the temperature, viscosity, and specific gravity of melted atactic P.P., the temperature and material of the cooling surface, the inherent adhering property of atactic P.P., etc. It is easy to adjust the various conditions so as to give a suitable amount of treatment and suitable thickness of sheet in actual practice.

Among the above-mentioned various conditions the one which is the most important is a viscosity of atactic P.P. It is in the range of 10 to 1,000 cp. preferably 20 to 500 cp. In order to maintain the above-mentioned viscosity, the reservoir 2 is heated and the temperature of melted atactic P.P. in this reservoir is maintained at a suitable temperature in the range of 130° to 250° C., preferably 150° to 230° C.

Then a linear velocity of the cooling surface of the revolving drum can be selected adequately in the range of 0.005 m./sec. to 0.5 m./sec., preferably 0.01 m./sec. to 0.3 m./sec. depending upon the viscosity of melted atactic P.P.

The adequate depth of immersion of the cooling drum in the melt of atactic P.P. maintained in the reservoir is considerably limited in order to keep the thickness of sheet 7 in the range of 1 mm. to 3 mm., as hereinafter explained but it is preferable to select from the range of 1–50 mm. preferably 2–20 mm.

The atactic P.P. sheet adhered and solidified on the cooling surface of the drum 3 can be detached from the drum 3 by a peeling knife 6 and detached sheet 7 is shredded by a slitter 8 into several or several tens of longitudinal strips. Square or rectangular pellets 11 are produced by drawing out the strips by a set of pinch rollers 9 and cuttig them by the up-and-down motion of cutter 10. The atactic P.P. thus obtained has almost no or extremely reduced mutual stickiness.

The reason why the production of such useful atactic P.P. has become possible seems to lie in following fact.

The atactic P.P. is a mixture of polymers ranging from relatively lower molecular weights to considerably higher ones and possesses as a whole a mean molecular weight.

Though this is a fact which cannot be seen in case of isotactic P.P., the atactic P.P. having such a low molecular weight as 10,000 to 40,000 has a large stickiness and a low solidifying temperature. On the other hand the one having such a high molecular weight as 100,000 has a low stickiness and a high solidifying temperature. The one having a medium molecular weight shows a medium stickiness and a medium solidifying temperature. Thus when atactic P.P. is quenched and solidified from melted state, the portion having higher molecular weights adhere to a cooling surface earlier than other portions and turn into solidified layer and make the portions having lower molecular weights difficult to ooze out. As a result, pelletized shaped articles which hardly stick to each other can be obtained.

On the other hand, since atactic P.P is a material having a low heat conductivity, it is inferred that quenching of one side surface of thick sheet does not afford the effect of reduction of stickiness to the other side. However, it has been confirmed by the inventors of the present invention after the study of the above-mentioned difficult problem that so long as thickness of sheet is so thin as 1–3 mm., the effect of reduction of stickiness by quenching can be obtained even on the surface which is not directly cooled by a cooling roll.

It is one of the constituting element of the present invention that atactic P.P. is quenched from its melted state by the use of a cooling surface of a revolving drum but the effectiveness above-mentioned can be obtained easily by the use of a cooling revolving drum. Moreover, to be convenient, there is accompanied such effect that the surface of shaped sheet of atactic P.P. contacting the cooling revolving drum shrinks to a greater extent than the opposite surface by which peeling off with a peeling knife becomes easier.

The atactic P.P. used in the present invention includes not only a by-product at the time of the production of isotactic P.P. but also atactic P.P. copolymers produced as by-products at the time of the production of terminal or sequential block copolymer consisting of an isotactic P.P. segment or segments and a terminal or sequential segments of ethylene or butene-1 or random copolymer of propylene and ethylene or butene-1.

Example 1

Melted atactic P.P. homopolymer having a mean molecular weight of 30,000 was charged to a reservoir of the melt 2 of the drawings and maintained at 170° C. A cooling water was passed through the inside of a cooling drum 3 and a temperature of 20° C. at an inlet and a temperature of 22° C. at an outlet are maintained. The cooling drum 3 was revolved in the direction indicated by an arrow mark

at a linear velocity of cooling surface of 0.025 m./sec. whereby atactic P.P. adheres to the cooling surface of the drum with a thickness of 2 mm. A sheet 7 obtained by peeling off this adhered layer by a peeling knife 6 was slitted longitudinally by a slitter 8 to give strips of 3 mm. width, drawn out by pinch rolls 9 in the direction indicated by an arrow mark→ and then cut by a cutter 10 to give a length of 3 mm. Thus square transparent non-sticky pellets 11 of atactic P.P. were produced at a rate of 200 kg./hr. per 1 m.² of the surface of the cooling drum.

Example 2

The procedure of Example 1 was repeated excepting that atactic P.P. of copolymer containing 5 mol percent of ethylene portion, having a mean molecular weight of 55,000 which was produced, as a by-product at the time of the production of ethylene-propylene terminal block copolymer was substituted for atactic P.P. of homopolymer of Example 1, the temperature of the reservoir for the melt 2 was maintained at 190° C. and a cooling drum was operated at a linear velocity of a cooling surface of 0.05 m./sec., whereby non-sticky pellets 11 of atactic P.P. of copolymer was produced at a rate of 150 kg./hr. per 1 m.² of the surface of the cooling drum.

Example 3

Atactic P.P. of homopolymer having a mean molecular weight of 100,000 was charged to a reservoir for the melt 2 of the drawings and maintained 210° C. A cooling water was passed through the inside of a cooling drum and a temperature of 15° C. at an inlet and a temperature of 20° C. at an outlet were maintained. When the cooling drum was revolved in the direction of arrow mark

atactic P.P. adhered to the cooling surface with a thickness of 1.5 mm. The adhered layer was slitted longitudinally to give strips 2.5 mm. wide drawn out by pinch rolls 9 as shown by an arrow mark → and cut by a cutter 10 so as to make the length of pellet 4 mm. Thus rectangular, transparent, non-sticky pellets 11 of atactic P.P. were produced at a rate of 450 kg./hr. per 1 m.² of the surface of the cooling crum.

Example 4

The procedure of Example 3 was repeated excepting that atactic P.P. of copolymer consisting of propylene segment and ethylene-propylene random segment, containing 3 mol percent of ethylene and having a mean molecular weight of 85,000 was substituted for atactic P.P. of homopolymer, the temperature of reservoir for the melt 2 was maintained at 200° C. and a cooling drum was operated at a linear velocity of cooling surface of 0.05 m./sec. whereby non-sticky pellets 11 of atactic P.P. of copolymer were produced at a rate of 350 kg./hr. per 1 m.² of the surface of the cooling drum.

What is claimed is:
1. The method which consists essentially of
   (a) heating and melting a normally sticky atactic polypropylene having a molecular weight between about 10,000 and 100,000 until it is freed from moisture and solvent, said melted polypropylene being maintained at a viscosity within the range of 10 to 1,000 centipoises and at a temperature within the range of 130° to 250° C.,
   (b) positioning a revolving drum so that a portion of the surface of the drum dips between 1–50 mm. below the surface of said melted atactic polypropylene,
   (c) revolving said drum at a linear velocity of between 0.005 meter per second and 0.5 meter per second so that a layer of polypropylene between 1 mm. and

3 mm. thick adheres to the surface of the drum,
(d) cooling the drum by passing a cooling fluid through the interior of the drum so that the molten layer-adhering to the surface of the drum solidifies by cooling,
(e) peeling the solidified layer of polypropylene from the rotating drum as a thin sheet, cutting said sheet longitudinally and transversely, and
(f) recovering a plurality of pellets of atactic polypropylene that have no mutual stickiness.

References Cited

UNITED STATES PATENTS 2,697,249 12/1954 Bettes, Jr. et al. _____ 264—144
3,023,253 2/1962 Bain et al. _____ 264—144

FOREIGN PATENTS 874,759 8/1961 Great Britain _____ 264—144

ROBERT F. WHITE, Primary Examiner
J. R. HALL, Assistant Examiner